May 11, 1954 K. SCHÜTZ 2,678,238
APPARATUS FOR DISTRIBUTING PULVERULENT
OR GRANULAR SUBSTANCES
Filed May 12, 1950 2 Sheets-Sheet 1

INVENTOR:
KURT SCHÜTZ

May 11, 1954

K. SCHÜTZ 2,678,238

APPARATUS FOR DISTRIBUTING PULVERULENT
OR GRANULAR SUBSTANCES

Filed May 12, 1950

INVENTOR:
KURT SCHÜTZ

Patented May 11, 1954

2,678,238

UNITED STATES PATENT OFFICE

2,678,238

APPARATUS FOR DISTRIBUTING PULVERULENT OR GRANULAR SUBSTANCES

Kurt Schütz, La Tour-de-Peilz, Switzerland, assignor to Berthoud & Cie, Vevey (Switzerland)

Application May 12, 1950, Serial No. 161,604

Claims priority, application Great Britain May 18, 1949

10 Claims. (Cl. 302—36)

This invention relates to machines for distributing pulverulent or granular substances, for example to apparatus for the distribution of pulverulent goods or substances, such as vermicides or pulverulent fertilisers, or to apparatus for the sowing of grain and the like.

Machines of this general description are already known which use a current of air and in which stationary and substantially silo-like dust containers are used. These have the drawback that the dust is compressed in the lower layers and forms so-called bridges, which tend to interfere with the delivery of the substances to the discharge members. Stirring mechanisms heretofore used are capable of breaking up the bridge formations. They do not, however, stop the compression of dust, since this compression is caused by stagnant dust, static pressure, narrowing shape of the bottoms of the containers and shakings or vibrations. Consequently, in spite of existing stirring mechanisms, the delivery of dust to the air current frequently becomes irregular or fails entirely. It is furthermore a drawback with apparatus of this nature that a dosing device is arranged at the bottom of the container, with the result that the dust will assume various conditions of density, according to the static pressure, physical constitution and jolting, and in consequence the quantitative dosing tends to vary.

These drawbacks are obviated by the apparatus according to the invention. According to the present invention a closed container is provided which is rotatable about a stationary hollow axle conveying the current of air. The container encloses, in the plane of rotation at its lowest point, a conveyor device which takes up the dust or the granular substances and conveys it into the hollow axle. The same apparatus can also be made with a bent hollow axle for the current of air and the conveyance of the material.

The closed container, which is provided with a charging opening, may, for example, be of circular cross-section and taper towards both ends. When using a cylindrical container, the axis of rotation is, for example, inclined slightly with respect to the horizontal. Here the lowest point is located close to the end surface.

The invention will now be further described with reference to the accompanying drawings in which two examples of carrying out the invention are represented.

Figure 1:
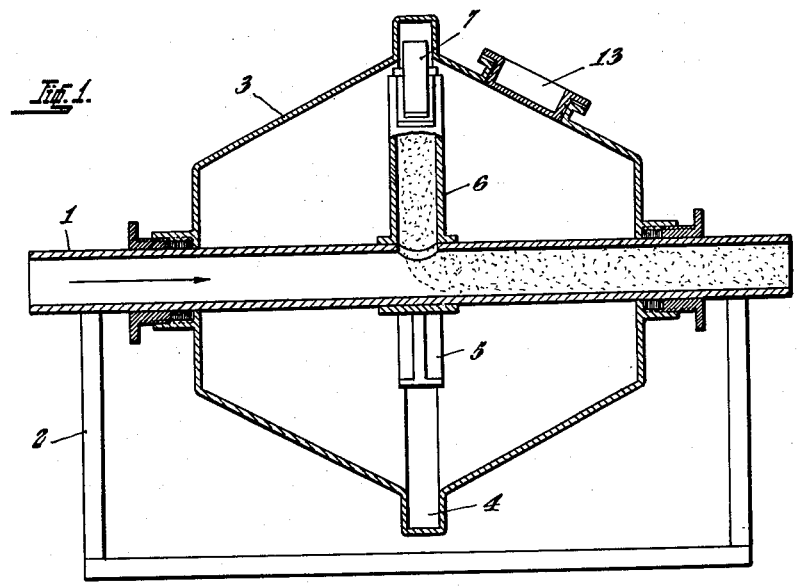
Fig. 1 is a longitudinal section through an apparatus in accordance with one of said examples of the invention.
Figures 2, 5:
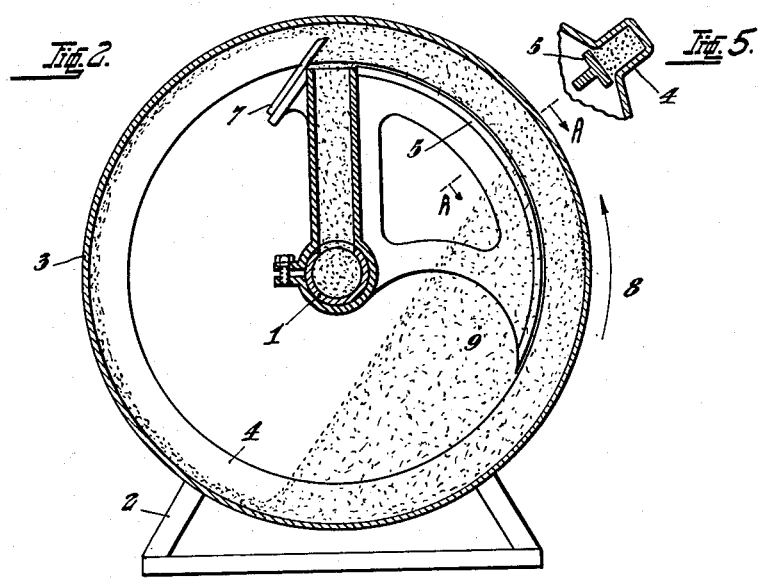
Fig. 2 is a cross-section through the apparatus of Fig. 1.
Fig. 5 is a section on the line A—A of Fig. 2.

In Figs. 1 and 2 a hollow axle or transverse portion of a T-shaped tubular means 1 is fixed on a frame 2. A container 3, which is of circular cross-section tapering towards the two outer or lateral ends, is carried by and for rotation about the axle 1. The container 3 is provided with a supply or charging opening 13. At the maximum diameter of and within the interior of the container, there is arranged an annular extension or a trough 4 which is partially covered by a segment 5 fixed on the axle. At the upper end of the segment there is located a shaft or perpendicular portion 6 of T-shaped tubular means, opening approximately perpendicularly into the hollow axle 1, and on which is rigidly fixed a displaceable cutting tool or chisel 7 in the nature of a flange.

If the container 3 is rotated in the direction of the arrow 8, the dust or the granular material is continuously rolled around, the upper part being thrown down. The parts thrown down fill up the trough 4 at the bottom. By the rotation of the container, the contents of the trough 4, which are prevented from falling out by the segment 5, reach the cutting chisel 7. If the cutting chisel is adjusted, for example, to half the depth of the trough, then half the contents of the trough is cut out and falls through the shaft 6 into the current of compressed air in the hollow axle 1, whilst the part of the contents of the trough not cut out remains in the trough or falls back into the container. In this way, the whole mass is continuously rolled over and over and kept uniformly loose. Solidification and bridge formations cannot take place. The dosing device is no longer under the static pressure of the dustlike or granular stock, but there is continuously conveyed to the dosing cutting chisel a flow of material of constant uniform density and thickness, so that a uniform dosing takes place. Even with moist dust suitable for baking, an operation free from trouble is ensured. The desired quantity for delivery per unit of time can be regulated by suitable retardation or acceleration of the speed of rotation of the container 3 and/or by shifting the cutting chisel 7. Thus the method for carrying out the invention when using applicant's apparatus comprises the steps of supplying pulverulent substance or material to container 3, then diverting said material to the interior of trough 4 at which a substantially narrow band or body of said material is formed, passing a portion of said band by gravity through shaft 6, thereby separating said portion from the remainder of said band of material, and then conveying said portion through hollow axle 1 to a location of distribution.

Figure 3:
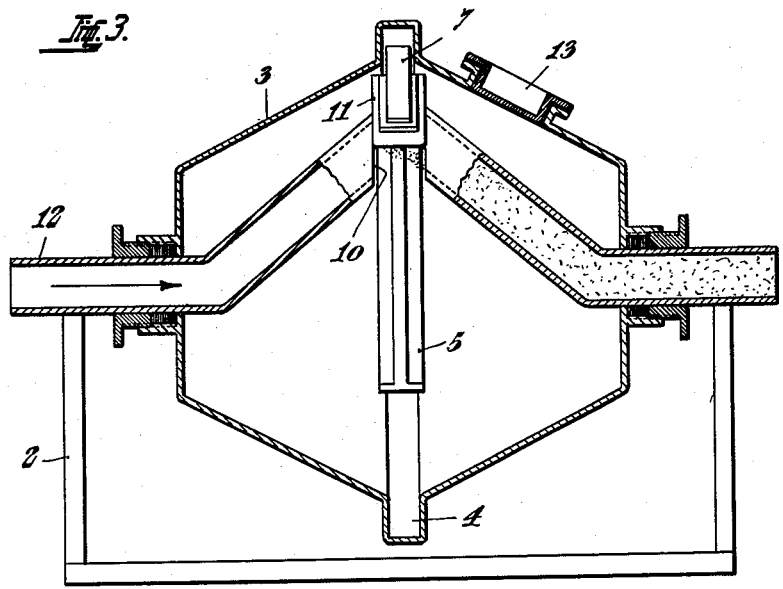
Fig. 3 is a longitudinal section through an apparatus in accordance with the other of said examples.
Figure 4:
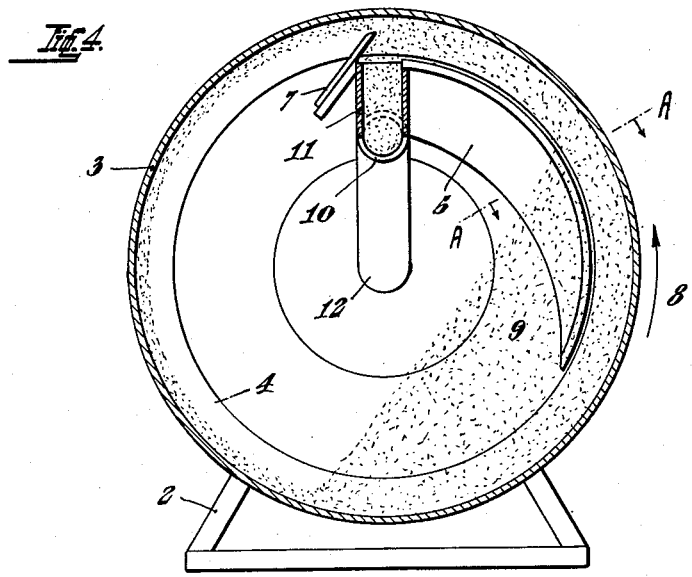
Fig. 4 is a cross-section through the apparatus of Fig. 3.

The example of execution of the invention in which a bent axle (Figures 3 and 4) is employed operates in the same manner. Here, however, the shaft 11 is shortened and the hollow axle 12 is provided with an opening 10 underneath the shaft. The advantage of this arrangement is that the dust or grains falling into the shaft 11 are only conveyed into the hollow axle 12 when a current of air flows therein. If the current of air is cut off from the rotating container, then the dust or the granular substances fall through the opening 10 back into the container 3.

Having thus described the invention, what is claimed as new and desired to be secured by Letters Patent, is:

1. A machine for discharging comminuted material from a container, comprising a stationary hollow axle connected to a fluid supply source and supporting said container for rotation on said axle, said container being provided with a substantially centrally located trough, a hollow shaft stationary with said axle extending within said container and angularly to said axle and in communication with the latter and with the interior of said extension, cutting means, and a segment fixed together with said cutting means on said shaft, said segment extending at least partly over said trough, said cutting means being adjustable to project a predetermined distance into said trough, whereby upon rotation of said container said cutting means causes deviation of said material into said hollow shaft whence said material is directed to said hollow axle upon supply of fluid to the latter in the direction thereof and from one end to the other end of the latter.

2. A machine according to claim 1, wherein said container is provided with inner walls diverging from said trough toward the outer ends of said walls.

3. A machine for discharging comminuted material from a container, comprising a stationary hollow axle connected to a fluid supply source and supporting said container for rotation on said axle, said container being provided with a substantially centrally located annular extension, a hollow shaft stationary with said axle extending within said container and angularly to said axle and in communication with the latter and with the interior of said extension, means adjustably fixed to and projecting from said shaft a predetermined distance into said extension, whereby upon rotation of said container said means will divert material from said extension into said hollow shaft whence said material is directed to said hollow axle upon supply of fluid to the latter in the direction thereof and from one end to the other end of the latter.

4. In distributing apparatus for granular material; the combination of T-shaped tubular means having a transverse portion and a portion substantially perpendicular to said transverse portion, a housing rotatably supported on said transverse portion with said perpendicular portion extending substantially centrally of said housing, a trough-shaped portion forming part of said housing and in communication with said perpendicular portion and through the latter with said transverse portion, and respective means carried by said transverse portion for guiding said material from the interior of said housing to said trough-shaped portion, thence into said perpendicular and transverse portions from which said material is distributed.

5. Apparatus for distributing pulverulent and like granular substance, comprising a hollow container for said substance provided with a trough intermittent the ends thereof, stationary hollow axle means adapted to convey a current of air therethrough, said axle means extending through the interior of said container and supporting the latter for rotation thereon, stationary segment means fixed on said axle means, stationary shaft means on said axle means for conducting said substance from within said trough to the interior of said shaft means when said container is rotated on said axle means, and an adjustable cutting means, both said segment means and said cutting means projecting into said trough, whereby said substance is guided within said trough by said segment means, picked up by said cutting means, and conveyed through said shaft means and into said axle whence it is carried by said current of air for distributing purposes.

6. Apparatus for distributing pulverulent and like granular substance, comprising a hollow container for said substance, stationary hollow axle means adapted to convey a current of air therethrough, said axle means extending through the interior of said container and supporting the latter for rotation thereon, said axle means being provided with a bend intermittent the ends thereof and with an opening extending within the bight portion of said band, said opening communicating with the interior of said container, stationary shaft means on said axle means and adjacent said band for conducting said substance from within said container to the interior of said shaft means, whereby when said container is rotated on said axle means said substance is conducted through said shaft means and falls back into said container through said opening unless current of air is conveyed through said axle means and carries said substance therethrough for distributing purposes.

7. Apparatus for distributing pulverulent granular material comprising a hollow container mounted for rotation about an axis, the walls of said container being substantially circular in any cross-section perpendicular to said axis, said container being provided with an annular trough the maximum internal radius of which exceeds the radius of any said circular cross-section, means for admitting air under pressure into said container, a cylindrical arcuate wall fixedly supported adjacent said trough in a position to constitute substantially a closure therefor throughout a minor portion of the length thereof, plough means projecting into the trough at a point which is down-stream in respect to the rotation of the trough past said arcuate wall, whereby material carried in said trough is removed therefrom, and outlet means opening to the interior of the hollow container at a point adjacent said plough means and extending out of said container along the axis thereof.

8. Apparatus according to claim 7 in which the axis is substantially horizontal, in which the arcuate wall extends through at least 90° and in which the plough means is approximately vertically above the axis.

9. Apparatus according to claim 8 in which the arcuate wall extends from a point below the horizontal plane of the axis to a point approximately vertically above the axis.

10. Apparatus according to claim 7 in which the outlet means is located between the plough means and the adjacent end of the arcuate wall.

References Cited in the file of this patent

UNITED STATES PATENTS

| Number | Name | Date |
|---|---|---|
| 1,686,256 | Royle | Oct. 2, 1928 |
| 2,503,170 | Plos | Apr. 4, 1950 |